(12) United States Patent
Voor et al.

(10) Patent No.: US 12,218,702 B2
(45) Date of Patent: Feb. 4, 2025

(54) PROVIDING A SINGLE FILTER FOR TRANSMIT AND RECEIVE MODES

(71) Applicant: Silicon Laboratories Inc., Austin, TX (US)

(72) Inventors: Thomas Edward Voor, Cedar Park, TX (US); Jeffrey L Sonntag, Austin, TX (US); Luigi Panseri, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 17/851,534

(22) Filed: Jun. 28, 2022

(65) Prior Publication Data

US 2024/0063841 A1    Feb. 22, 2024

(51) Int. Cl.
*H04B 1/44* (2006.01)

(52) U.S. Cl.
CPC ........................... *H04B 1/44* (2013.01)

(58) Field of Classification Search
CPC ........... H04B 1/44; H04B 1/48; H04B 1/0458
See application file for complete search history.

(56) References Cited

U.S. PATENT DOCUMENTS

| | | | |
|---|---|---|---|
| 5,343,094 A | 8/1994 | Nguyen | |
| 7,151,759 B1 | 12/2006 | Ryan et al. | |
| 9,793,871 B1 | 10/2017 | Kim et al. | |
| 10,056,875 B1 | 8/2018 | Beaudin et al. | |
| 11,337,162 B1 | 5/2022 | Cariou et al. | |
| 11,901,924 B2 | 2/2024 | Voor et al. | |
| 2004/0140719 A1 | 7/2004 | Vulih et al. | |
| 2008/0182534 A1 | 7/2008 | Bonesteel et al. | |
| 2013/0135043 A1* | 5/2013 | Hietala | H03F 3/245 330/124 R |
| 2013/0207473 A1 | 8/2013 | Jain | |
| 2015/0270744 A1 | 9/2015 | Lacarnoy | |
| 2016/0277045 A1 | 9/2016 | Langer | |
| 2016/0301369 A1 | 10/2016 | Heaney et al. | |
| 2018/0014266 A1 | 1/2018 | Chen | |
| 2018/0192379 A1 | 7/2018 | Gross et al. | |
| 2018/0226932 A1 | 8/2018 | Beaudin et al. | |

(Continued)

OTHER PUBLICATIONS

United States Patent Office, Non-Final Office Action dated Jul. 19, 2023 in U.S. Appl. No. 17/897,706 (10 pages).

(Continued)

*Primary Examiner* — Patrick C Chen
(74) *Attorney, Agent, or Firm* — Trop, Pruner & Hu, P.C.

(57) ABSTRACT

In one embodiment, an apparatus includes: a transmit path to receive, process and output a transmit radio frequency (RF) signal, the transmit path including a first power amplifier; a receive path to receive, process and output a receive RF signal, the receive path including a first low noise amplifier (LNA); and switching circuitry coupled to the transmit path and the receive path. In a transmit mode, the switching circuitry is to cause a RF filter to couple into the transmit path to filter the transmit RF signal and cause the filtered transmit RF signal to be provided to the first power amplifier and thereafter to an antenna. In a receive mode, the switching circuitry is to cause the receive RF signal to be provided to the RF filter and the first LNA, and thereafter to be provided to a digital processor.

19 Claims, 5 Drawing Sheets

(56) References Cited

U.S. PATENT DOCUMENTS

| | | | |
|---|---|---|---|
| 2020/0067559 A1* | 2/2020 | Wich | H04B 1/44 |
| 2021/0218434 A1* | 7/2021 | Pehlke | H04B 1/006 |
| 2021/0320081 A1* | 10/2021 | Babcock | H01L 25/16 |
| 2022/0182084 A1* | 6/2022 | King | H04B 1/04 |
| 2022/0214385 A1 | 7/2022 | Hecht et al. | |
| 2022/0345098 A1 | 10/2022 | Panseri | |
| 2022/0345170 A1 | 10/2022 | Panseri et al. | |
| 2023/0421183 A1 | 12/2023 | Voor et al. | |
| 2023/0421191 A1 | 12/2023 | Voor et al. | |
| 2023/0421192 A1 | 12/2023 | De Ruijter et al. | |
| 2023/0421193 A1 | 12/2023 | De Ruijter et al. | |
| 2023/0421194 A1 | 12/2023 | Voor et al. | |
| 2023/0421197 A1 | 12/2023 | De Ruijter et al. | |
| 2023/0422053 A1 | 12/2023 | Voor et al. | |

OTHER PUBLICATIONS

United States Patent Office, Notice of Allowance dated Oct. 4, 2023 in U.S. Appl. No. 17/897,706 (9 pages).

United States Patent Office, Reply to Office Action filed Sep. 26, 2023 in U.S. Appl. No. 17/897,706 (7 pages).

United States Patent Office, Notice of Allowance dated Oct. 13, 2023 in U.S. Appl. No. 17/897,652 (17 pages).

U.S. Appl. No. 17/897,620, filed Aug. 29, 2022, entitled "Configurable Receiver Front End Module Having Configurable Detection Capabilities" in the name of Thomas Edward Voor.

U.S. Appl. No. 17/897,637, filed Aug. 29, 2022, entitled "Control of Configurable Receiver Front End Module Based at Least in Part on Signal Metric Information" in the name of Thomas Edward Voor.

U.S. Appl. No. 17/897,652, filed Aug. 29, 2022, entitled "Initialization of Configurable Receiver Front End Module Into a Selected Mode" in the name of Hendricus De Ruijter.

U.S. Appl. No. 17/897,671, filed Aug. 29, 2022, entitled "Reconfiguration of Configurable Receiver Front End Module Between Plurality of Modes" in the name of Hendricus De Ruijter.

U.S. Appl. No. 17/897,693, filed Aug. 29, 2022, entitled "Interrupt Driven Reconfiguration of Configurable Receiver Front End Module" in the name of Hendricus De Ruijter.

U.S. Appl. No. 17/897,706, filed Aug. 29, 2022, entitled "Power Variation Correction for a Transmitter" in the name of Thomas Edward Voor.

U.S. Appl. No. 17/897,721, filed Aug. 29, 2022, entitled "Central Entity Update of Configurable Receiver Front End Module Between Static Modes" in the name of Thomas Edward Voor.

Silicon Labs, "MGM12P Wireless Gecko Multi-Protocol Module Data Sheet," Feb. 2020, Rev. 1.4, 100 Pages.

United States Patent Office, Reply to Office Action filed May 21, 2024 in U.S. Appl. No. 17/897,693 (9 pages).

United States Patent Office, Non-Final Office Action dated Feb. 21, 2024 in U.S. Appl. No. 17/897,693 (26 pages).

Bisdounis et al., "Low-power system-on-chip architecture for wireless LANs", IEE Proceedings-Computers and Digital Techniques, vol. 151, No. 1, Jan. 2004, pp. 2-15.

United States Patent Office, Final Office Action dated Oct. 4, 2024 in U.S. Appl. No. 17/897,693 (19 pages).

United States Patent Office, Rsponse after Final Office Action Filed Nov. 25, 2024 in U.S. Appl. No. 17/897,693 (11 pages).

United States Patent Office, Notice of Allowance dated Dec. 19, 2024 in United States U.S. Appl. No. 17/897,693 (14 pages).

* cited by examiner

//]: #

PROVIDING A SINGLE FILTER FOR TRANSMIT AND RECEIVE MODES

BACKGROUND

Many small wireless devices include multiple integrated circuits and other components, all of which are typically adapted on a circuit board. In many instances, transceiver circuitry that performs transmit and receive functions couple to multiple off-chip components including filters, amplifiers and so forth. In many cases, separate off-chip components are required. For example, there may be a first off-chip filter to couple to a transmit path and a separate second off-chip filter to couple to a receive path. In this way, circuit board area is undesirably consumed and bill of material costs increase.

SUMMARY OF THE INVENTION

In one aspect, an apparatus includes: a transmit path to receive, process and output a transmit radio frequency (RF) signal, the transmit path comprising a first power amplifier; a receive path to receive, process and output a receive RF signal, the receive path comprising a first low noise amplifier (LNA); and switching circuitry coupled to the transmit path and the receive path. In a transmit mode, the switching circuitry is to cause a RF filter to couple into the transmit path to filter the transmit RF signal and cause the filtered transmit RF signal to be provided to the first power amplifier and thereafter to an antenna. In a receive mode, the switching circuitry is to cause the receive RF signal to be provided to the RF filter and the first LNA, and thereafter to be provided to a digital processor.

In an embodiment, the apparatus comprises a first integrated circuit (IC) having a transceiver including the transmit path and the receive path.

In an embodiment, the RF filter comprises a surface acoustic wave (SAW) filter, the SAW filter external to the first IC and coupled to the first IC via a first conductive element and a second conductive element.

The switching circuitry may include: a first switch, where in the transmit mode, the first switch is to receive the transmit RF signal from the digital processor and provide the transmit RF signal to a second switch; the second switch coupled to the first switch, where in the transmit mode, the second switch is to provide the transmit RF signal to the RF filter; and a third switch, where in the transmit mode, the third switch is to receive the filtered transmit RF signal from the RF filter and provide the filtered transmit RF signal to the first power amplifier. In an embodiment, the switching circuitry further comprises a fourth switch coupled to the first power amplifier, where in the transmit mode, the fourth switch is to provide the amplified transmit RF signal to an antenna. In the receive mode, the fourth switch is to provide the receive RF signal to a selected one of: the third switch, to cause the receive RF signal to be provided to the RF filter; and a fifth switch to cause the receive RF signal to be provided to the first LNA.

In an embodiment, the apparatus further comprises: a sixth switch coupled to the first LNA; and a seventh switch coupled to the sixth switch and the second switch, where the seventh switch is to provide the receive RF signal to the digital processor. In an embodiment: in a first sub-mode of the receive mode, the third switch is to provide the receive RF signal to the RF filter, and the second switch is to cause the filtered receive RF signal to be provided to the first LNA; and in a second sub-mode of the receive mode, the fourth switch is to provide the receive RF signal to the fifth switch and the fifth switch is to provide the receive RF signal to the first LNA.

In an embodiment, in a bypass transmit mode, the third switch is to receive the transmit RF signal from the RF filter and cause the transmit RF signal to bypass the first power amplifier. In an embodiment, the apparatus further comprises a controller, where the controller is to receive a plurality of control signals from the digital processor and based at least in part on the plurality of control signals, to configure the switching circuitry. In an embodiment, in the transmit mode, the controller is to configure the switching circuitry to provide the transmit RF signal to the RF filter. In an embodiment, the controller: in a first receive mode, is to configure the switching circuitry to cause the receive RF signal to be provided to the RF filter and thereafter to the first LNA; and in a second receive mode, is to configure the switching circuitry to cause the receive RF signal to be provided to the first LNA and thereafter to the RF filter.

In another aspect, a method comprises: receiving, in a controller of a RF front end circuit, a plurality of control signals from a processor; dynamically configuring switch circuitry of the RF front end circuit based at least in part on at least some of the plurality of control signals; and communicating a first RF signal through the RF front end circuit via the switch circuitry and through a SAW filter coupled to the RF front end circuit, where the SAW filter is useable in a transmit mode and in a receive mode.

In an embodiment, the method further comprises decoding, in the controller, the plurality of control signals to identify one of the transmit mode or the receive mode. In an embodiment, the method further comprises identifying, based on the decoding, a first receive sub-mode in which, via the switch circuitry, the first RF signal is to pass to the SAW filter and thereafter to a LNA of the RF front end circuit. In an embodiment, the method further comprises identifying, based on the decoding, a second receive sub-mode in which, via the switch circuitry, the first RF signal is to bypass the SAW filter.

In another aspect, a system includes first and second integrated circuits, an RF filter, and an antenna. The first integrated circuit may include: a digital processor to perform at least one function, and transceiver circuitry coupled to the digital processor, the transceiver circuitry comprising: a first amplifier to amplify a transmit RF signal; and a second amplifier to amplify a receive RF signal. The second integrated circuit may include: a RF front end circuit, the RF front end circuit comprising: a transmit path to receive, process and output the transmit RF signal, the transmit path comprising a third amplifier; a receive path to receive, process and output the receive RF signal, the receive path comprising a fourth amplifier; and switching circuitry coupled to the transmit path and the receive path. In a transmit mode, the switching circuitry is to direct the transmit RF signal to a RF filter and the third amplifier, and thereafter to an antenna. In a receive mode, the switching circuitry is to direct the receive RF signal to the RF filter and the fourth amplifier, and thereafter to the first integrated circuit. The RF filter may be coupled to the second integrated circuit, and the antenna coupled to the second integrated circuit, where the antenna is to receive the receive RF signal and radiate the transmit RF signal.

In an embodiment, the switching circuitry comprises: a first switch, where in the transmit mode, the first switch is to receive the transmit RF signal from the first integrated circuit and provide the transmit RF signal to a second switch; the second switch coupled to the first switch, where in the transmit mode, the second switch is to provide the transmit RF signal to the RF filter; a third switch, where in the transmit mode, the third switch is to receive the transmit RF signal from the RF filter and provide the transmit RF signal to the third amplifier; and a fourth switch coupled to the third amplifier, where: in the transmit mode, the fourth switch is to provide the transmit RF signal to the antenna; and in the receive mode, the fourth switch is to provide the receive RF signal to the fourth amplifier.

In an embodiment, the system further comprises an attenuator coupled between the second switch and a fifth switch, and where in at least one of the transmit mode and the receive mode, the attenuator is to attenuate at least one of the transmit RF signal and the receive RF signal.

In an embodiment, the RF front end circuit comprises a controller to receive a plurality of control signals from the first integrated circuit and based at least in part on the plurality of control signals, to configure the switching circuitry, where: in a first receive mode, the controller is to configure the switching circuitry to cause the receive RF signal to be provided to the RF filter and thereafter to the fourth amplifier; and in a second receive mode, the controller is to configure the switching circuitry to cause the receive RF signal to be provided to the fourth amplifier and thereafter to the RF filter.

DETAILED DESCRIPTION

Figure 1:
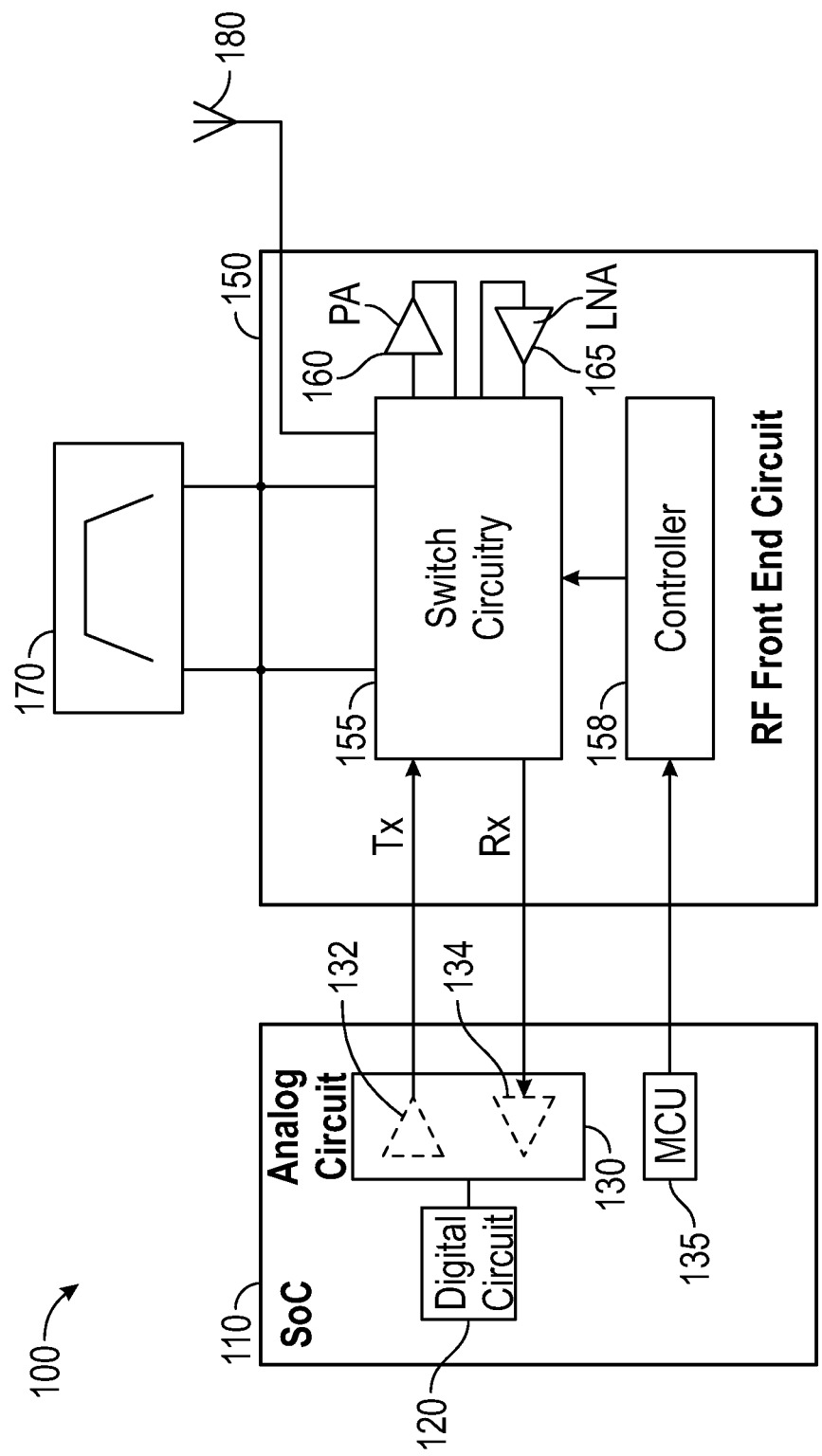
FIG. 1 is a high level block diagram of a portion of a device incorporating an embodiment.

In various embodiments, an integrated circuit having transceiver circuitry may further include switch circuitry to enable both a transmit path and a receive path to use a single off-chip filter. The switch circuitry may be dynamically controlled depending on mode of operation (e.g., receive or transmit) to programmably and dynamically direct appropriate receive or transmit signals to such off-chip filter. In a transmit direction, this single off-chip filter may couple between a transmit driver and a transmit power amplifier. And in a receive direction, this single off-chip filter may couple between a receive port and an on-chip amplifier. Such switch circuitry may be implemented with minimal insertion loss that has minimal effect on system performance.

With embodiments, a single off-chip filter may provide sufficient suppression of spurs for transmit signals, and in a receive mode may provide filtering of blocking signals and enhancing immunity. Although embodiments are not limited in this regard, implementations of a transceiver that include such switching circuitry may be used in a variety of different device types including sub-gigahertz (GHz) industrial scientific and medical (ISM) devices, such as may operate at a frequency range of somewhere between approximately 850 megahertz (MHz) and 925 MHz.

In some implementations, there may be multiple receive modes, including a so-called rural mode which may be used in an environment in which there are relatively few blocking or other interfering signals. In a rural mode, switching circuitry may be controlled to provide a receive path in which an incoming RF signal received via an antenna is provided first to a low noise amplifier (LNA) and then to an off-chip filter. Instead in a so-called urban mode, which may be active when a device is in an urban or other highly congested environment in which there may be potentially many blocking or interfering signals, switching circuitry may be controlled such that an incoming RF signal received via an antenna is first provided to the off-chip filter before being provided to the LNA.

By such control, a receiver implementation may realize a good noise figure in a rural environment while the same receiver, differently configured, may realize good blocking in an urban environment. Note also it is possible in both transmit and receive modes for the off-chip filter to be bypassed. Still further, in some situations for a transmit mode an external power amplifier also may be bypassed when a transmit RF signal is received within the RF front end circuit with sufficient power for a given environment. For example, in certain countries, e.g., Japan, an ISM device may have regulatory requirements that limit its output power to 13 dBm (or 14 dBm in Europe). In such an implementation, the external power amplifier can be bypassed. Also in such cases, if a RF signal output from SoC 110 is greater than a certain power level (e.g., 10 dBm), the off-chip filter may be bypassed, to avoid damage that could occur from providing it a signal that exceeds its capability.

Referring now to FIG. 1, shown is a high level block diagram of a portion of a device such as an IoT device incorporating an embodiment. As illustrated in FIG. 1, IoT device 100 may be any type of IoT device that has wireless communication capabilities. In one or more embodiments, IoT device 100 may operate with a radio that uses the same frequency band for transmit and receive (half duplex), as opposed to cellular, which has different frequency for uplink and downlink. While embodiments may vary, the IoT device may be a metering device, an actuator device, a sensor device, wireless microcontroller (MCU), wireless camera, wireless speaker, wireless microphone, wireless lighting controller, lightbulb, or so forth.

In the high level shown in FIG. 1, a system on chip (SoC) 110 couples via an RF front end circuit 150 to an antenna 180, which may be used for both transmit and receive operations. Of course in other implementations, there may be separate antennas for receive and transmit. In the embodiment of FIG. 1, SoC 110 may be implemented in one integrated circuit (IC) and RF front end circuit 150 implemented in another IC. In other cases, both of these components may be implemented in a single IC. In typical cases, the circuitry of SoC 110 may be implemented on one semiconductor die and the circuitry of RF front end circuit 150 may be implemented on a different semiconductor die, whether implemented in separate ICs or in the same IC package. Further, while the specific implementation of FIG. 1 includes an SoC, in other cases, some other type of digital processor such as a baseband processor and/or application processor may be present.

Starting with SoC 110, a digital circuit 120 is present, which may perform the overall processing of the device. Although embodiments are not limited in this regard, the processing may include activities such as performing sensing, metering, controller functionality, actuator functionality or so forth. To enable wireless communication, digital information may be provided from digital circuit 120 to an analog circuit 130. In general, analog circuit 130 may include transceiver circuitry having transmit and receive paths including signal processing circuitry that perform various processing, including digital-to-analog conversion (in the transmit direction) and analog-to-digital conversion (in the receive direction), upconversion and downconversion, filtering, amplification and so forth.

Analog circuit 130 may transform the digital signals to analog form and further perform upconversion and other signal processing to generate RF signals. As seen in FIG. 1, analog circuit 130 may optionally include a power amplifier (PA) 132 that may amplify the incoming RF signals and output them to RF front end circuit 150.

In a receive direction, incoming receive signals that are received in SoC 110 couple to analog circuit 130. As further shown optionally a LNA 134 may be provided for gain control, before additional signal processing is performed. This signal processing may include, e.g., filtering, further gain control, and downconversion to result in digital signals that are provided to digital circuit 120.

RF front end circuit 150 also has transceiver circuitry including transmit and receive paths. With respect to the transmit path, incoming RF signals received from SoC 110 couple through switch circuitry 155. Understand that switch circuitry 155 is shown at a high level, logically as a single block. In practice, a number of different switches may be implemented within RF front end circuit 150 to perform the configurable switching and communication of receive and transmit signals according to different modes, as described further herein. That is, while switch circuitry 155 is shown as a single block, the multiple physical switch instantiations may be located throughout RF front end circuit 150. Also, by way of switch circuitry 155, both receive and transmit paths may leverage a single RF filter 170 coupled to RF front end circuit 150, thus reducing bill of materials (BOM) costs. In various embodiments, RF filter 170 may be implemented as a surface acoustic wave (SAW) filter. While for purposes of discussion, this RF filter is generally referred to herein as a SAW filter, understand that any type of RF filter, including various bandpass or low pass filters can be used.

With respect to the transmit path, RF signals to be transmitted may couple through switch circuitry 155 to SAW filter 170 (optionally), back through switch circuitry 155 and to a PA 160 for further amplification, before being output (through additional circuitry in switch circuitry 155) to antenna 180.

In a receive path, incoming RF signals received by antenna 180 couple into switch circuitry 155. Such receive RF signals, before or after gain control in a LNA 165, may be filtered by SAW filter 170, and pass further through switch circuitry 155 and thereafter be sent to SoC 110, and more specifically to analog circuit 130. Understand that while shown in the high level of FIG. 1 with a single LNA 165, in some cases there may be multiple LNAs that can be controllably coupled with SAW filter 170. For example, a received RF signal may pass through a first LNA, then through SAW filter 170, and then through a second LNA before being provided to SoC 110. And such multiple LNAs can be controlled to be bypassed, such that none, one, or both such LNAs may be part of a receive path.

In some cases, SoC 110 may provide an output signal at a power level of approximately zero dBm, which can be amplified both within PA 132 of analog circuit 130 of SoC 110 and PA 160 (or in cases, PA 160 may be bypassed). Note that in some cases, SAW filter 170 may be designed to only withstand approximately 10 dBm of power, such that in the transmit direction the transmit RF signal may be filtered in SAW filter 170 prior to further amplification.

As further shown in FIG. 1, SoC 110 may include a microcontroller unit (MCU) 135. Among its duties, MCU 135 sends mode control signals to RF front end circuit 150. As seen, these signals may be provided to a controller 158 (which may be implemented as a microcontroller, finite state machine or so forth). In response to such control signals, controller 158 may dynamically configure and reconfigure switch circuitry 155 to operate in a given one of a transmit or receive mode (as RF front end circuit 150 can only operate in a transmit or receive direction at any given time). Still further, in various implementations there may be multiple receive modes and potentially multiple transmit modes available and which may entail different configurations of switch circuitry 155. Understand while shown at this high level in the embodiment of FIG. 1, many variations and alternatives are possible.

Figure 2:
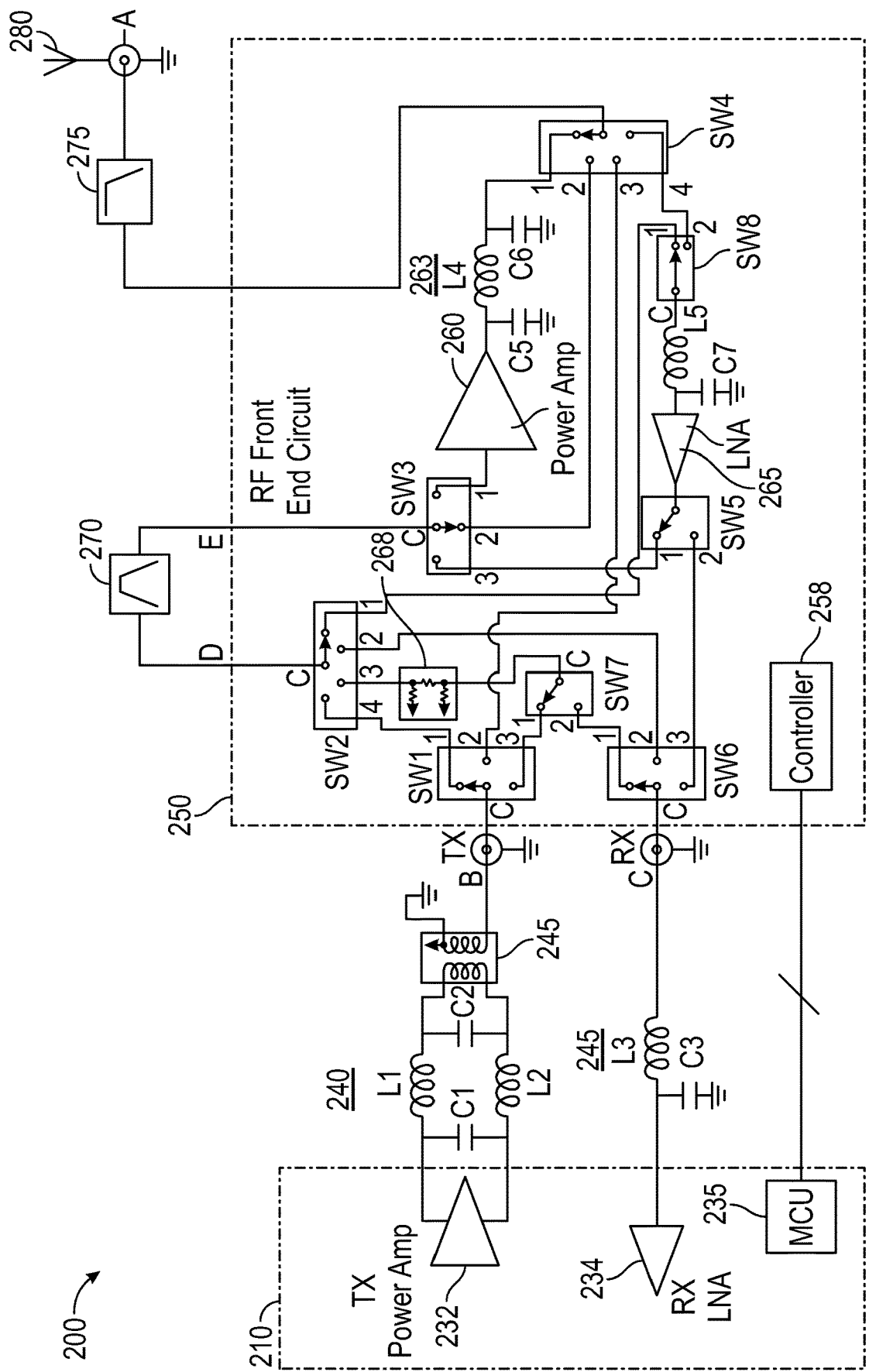
FIG. 2 is a schematic diagram illustrating further details of a switch arrangement in accordance with an embodiment.

Referring now to FIG. 2, shown is a schematic diagram illustrating further details of a switch arrangement in accordance with an embodiment. As shown in FIG. 2, a device 200 shows a more detailed view of a switch circuit implementation. In general, device 200 may be a similar IoT device as device 100 of FIG. 1, and thus to the extent that the same numbering conventions are used in FIG. 2 (although the "200" series rather than the "100" series of FIG. 1), like components are shown and in some cases are not further discussed below.

At a high level, device 200 includes an SoC 210, an RF front end circuit 250, a SAW filter 270, and an antenna 280. SoC 210 is shown in the illustration of FIG. 2 as having a transmit power amplifier 232 and a receive LNA 234.

In the transmit direction, PA 232 outputs a differential RF signal that couples through a differential impedance match circuit 240 (formed of inductors L1, L2 and capacitors C1, C2). The matched differential RF signal is converted to single-ended form via a balun 245. The resulting single-ended transmit RF signal couples to RF front end circuit 250 via a transmit port B, which also may be used as a test port.

In the transmit direction, RF front end circuit 250 includes a transmit signal path including various switches and other circuitry to process and direct the transmit RF signal to its destination, namely, antenna 280. More specifically, with reference to FIG. 2, the transmit RF signal may couple through switches SW1 and SW2 (either with attenuation via an attenuator 268 using additional switch SW7, or unattenuated) to be directed to SAW filter 270 (via off-chip ports D and E, respectively). In an embodiment SAW filter 270 may be a bandpass filter configured to pass a band appropriate for a given device (e.g., between 875 and 950 MHz). After being filtered in SAW filter 270, the filtered transmit RF signal couples through switch SW3 and to power amplifier (PA) 260, before being output through matching circuitry 263 (including inductor L4 and capacitors C5, C6). From there, the amplified transmit RF signal couples through switch SW4 and is output from RF front end circuit 250 and through a low pass filter (LPF) 275 to antenna 280 coupled to a port A. In an embodiment, LPF 275 may be a third order low pass harmonic filter having a typical loss level of approximately 0.5 dB. Note that the position of LPF 275 and SAW filter 270 may not be swapped, as in some use cases, the RF signal level that passes through LPF 275 would cause damage to SAW filter 270.

Still with reference to FIG. 2, in a receive direction, incoming RF signals pass through antenna 280 and LPF 275 and into RF front end circuit 250. In the receive direction, the incoming receive RF signal couples through switch SW4 and, depending upon mode, either directly to LNA 265 (via switch SW8) or via switch SW3 to SAW filter 270 (and thereafter through switches SW2 and SW8) and then to LNA 265. This determination may be based on whether filtering is desired before or after amplification in LNA 265.

As seen, it is further possible for the amplified receive RF signal output by LNA 265 to pass through switches SW5 and SW3 to SAW filter 270. In yet other cases, SAW filter 270 may be bypassed in the receive direction, such that the amplified receive RF signal is provided directly from switches SW4 and SW8 through LNA 265 and through switches SW5 and SW6, and thereafter off-chip through an impedance matching circuit 245 formed of inductor L3 and capacitor C3 to SoC 210, and more specifically, to LNA 234.

Still further it is possible in the receive direction for attenuation to occur via attenuator 268 that couples between switch SW2 and switch SW7 and in turn, provides the attenuated receive RF signal to SoC 210 through switch SW6. While switches SW1-SW8 are illustrated in FIG. 2 as various single pole multiple throw (P/T switches), other types of switches may be used.

Of course while shown with this particular implementation with the above-described paths through RF front end circuit 250, switching circuitry may take various forms to enable transmit and receive paths to share a single SAW filter, reducing costs and complexity. Furthermore, it is possible by way of different control of the various switches to enable both transmit and receive RF signals to pass through the respective transmit and receive paths in different orders.

Still referring to FIG. 2, controller 258 may dynamically configure the various switches to enable operation in a desired transmit or receive mode, as well as sub-modes that may be available in a given implementation. To this end, controller 258 receives incoming front end control signals from SoC 210 (more specifically from MCU 235).

In response to these control signals, controller 258 may control the various switches as described above. In a particular embodiment, MCU 235 may output four front end mode control signals. Controller 258, based at least in part on these control signals, may dynamically configure the switches of RF front end circuit 250 accordingly. With four control lines being provided to controller 258, there may be sufficient programmability for 16 different modes, with approximately half of these modes available for transmit operations and half available for receive operations. Or certain states can be reserved for other modes such as testing or measurement modes.

Figure 3:
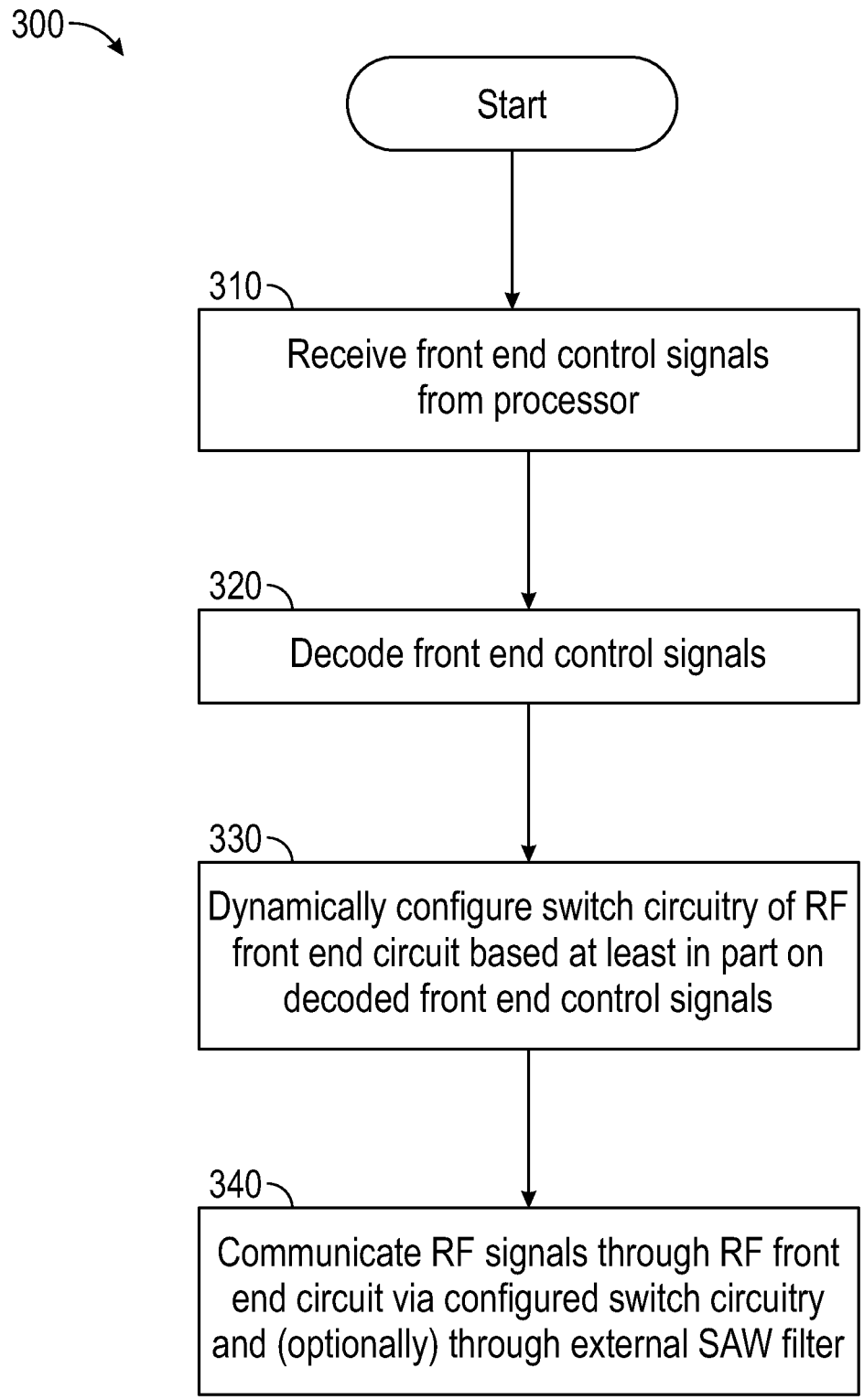
FIG. 3 is a flow diagram of a method in accordance with an embodiment.

Referring now to FIG. 3, shown is a flow diagram of a method in accordance with an embodiment. As shown in FIG. 3, method 300 is a method for controlling switch circuitry of an RF front end circuit such as may be performed by a controller or other hardware circuit within the RF front end circuit. In some cases, the controller may execute instructions stored in a non-volatile memory. In an embodiment, this non-volatile memory may be implemented as a non-transitory storage medium that can store instructions and data. Such non-volatile memory may store instructions, including instructions for receiving mode control signals and controlling switch circuitry in response to the mode control signals, as described herein.

As illustrated, method 300 begins by receiving front end control signals from a processor (block 310). As discussed above, there may be a plurality of control lines that provide control signals to indicate a desired mode and sub-mode, namely transmit or receive mode, and potential sub-modes including any bypass modes, urban/rural modes or so forth. Next at block 320, the front end control signals may be decoded, e.g., in the controller of the RF front end circuit.

Still with reference to FIG. 3, control passes to block 330 where switch circuitry of the RF front end circuit may be dynamically configured based at least in part on these decoded signals. In an embodiment as in FIG. 2, the single pole multiple throw switches may be controlled to provide a selected connection between a common port and a given one of the available throw ports. At this point the RF front end circuit is appropriately configured for operation in a given mode. As such, at block 340 RF signals may be communicated through the RF front end circuit via this configured switch circuitry. In this way, transmit or receive RF signals may pass through at least some of the switch circuitry according to a desired path such that the RF signals may optionally pass through a single external SAW filter, which may be used for both transmit and receive modes. Understand while shown at this high level in the embodiment of FIG. 3, many variations and alternatives are possible.

Figure 4:
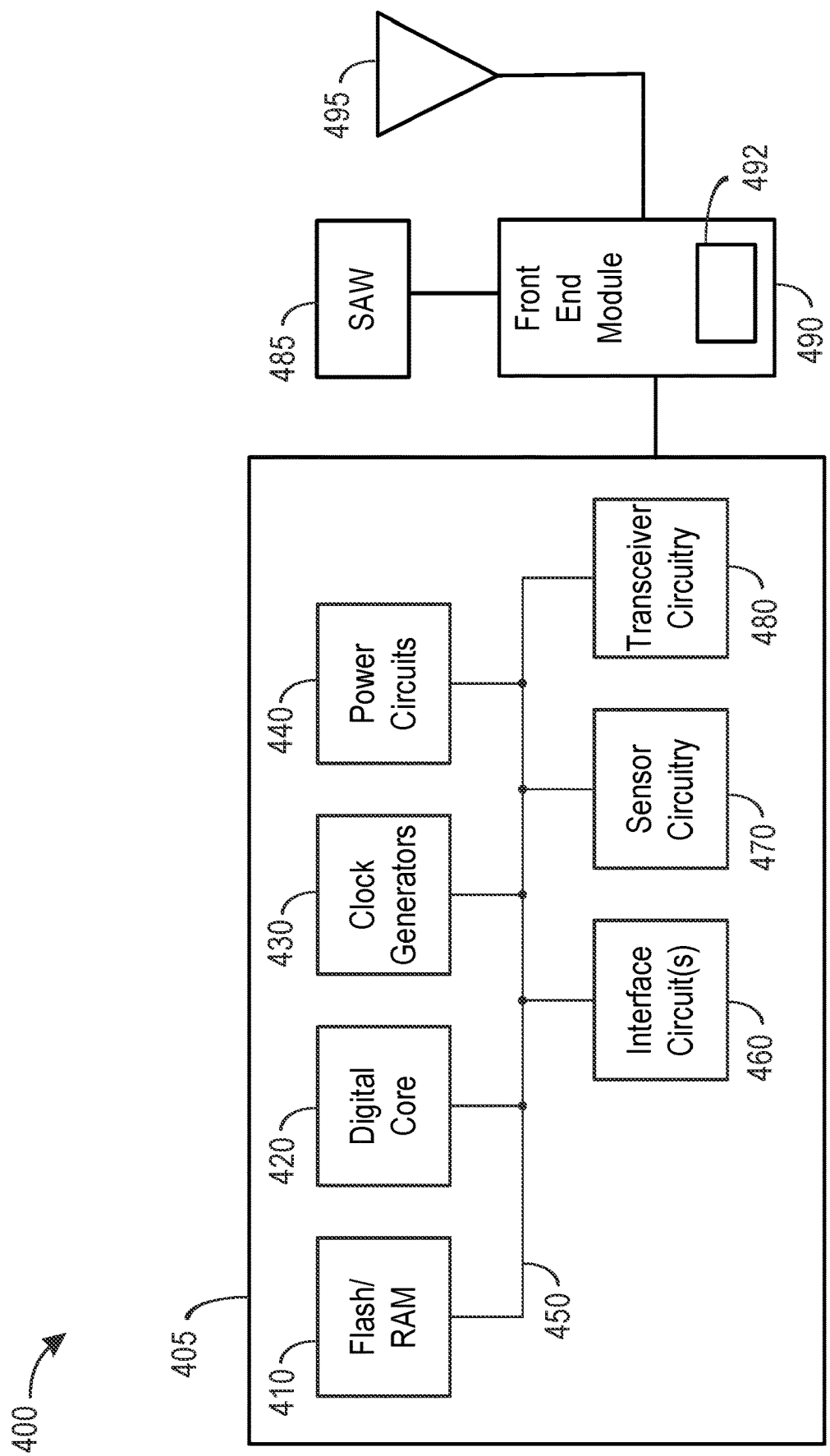
FIG. 4 is a block diagram of a representative IoT device that incorporates an embodiment.

Embodiments may be implemented in many different devices. Referring now to FIG. 4, shown is a block diagram of a representative IoT device 400 that includes SAW filter circuitry as described herein. In the embodiment shown in FIG. 4, IoT device 400 may be any connected device to provide a variety of different functionality. In the high level shown in FIG. 4, IoT device 400 includes an integrated circuit 405, e.g., a microcontroller, wireless transceiver that may operate according to one or more wireless protocols (e.g., WLAN-OFDM, WLAN-DSSS, Bluetooth, among others), or other device that can be used in a variety of use cases, including sensing, metering, monitoring, embedded applications, communications, applications and so forth, and which may be particularly adapted for use in an IoT device. In turn, integrated circuit 405 couples to a front end module 490 including switching circuitry 492 in accordance with an embodiment to enable both transmit and receive paths to leverage a single off-chip SAW filter 485.

In the embodiment shown, integrated circuit 405 includes a memory system 410 which in an embodiment may include a non-volatile memory such as a flash memory and volatile storage, such as RAM. In an embodiment, this non-volatile memory may be implemented as a non-transitory storage medium that can store instructions and data. Such non-volatile memory may store instructions, including instructions for generating control signals (e.g., in the form of the front end mode control signals discussed above) for use in controlling switching of switching circuitry 492 as described herein.

Memory system 410 couples via a bus 450 to a digital core 420, which may include one or more cores and/or microcontrollers that act as a main processing unit of the integrated circuit. In turn, digital core 420 may couple to clock generators 430 which may provide one or more phase locked loops or other clock generator circuitry to generate various clocks for use by circuitry of the IC.

As further illustrated, IC 405 further includes power circuitry 440, which may include one or more voltage regulators. Additional circuitry may optionally be present depending on particular implementation to provide various functionality and interaction with external devices. Such circuitry may include interface circuitry 460 which may provide interface with various off-chip devices, sensor circuitry 470 which may include various on-chip sensors including digital and analog sensors to sense desired signals, such as for a metering application or so forth.

In addition as shown in FIG. 4, transceiver circuitry 480 may be provided to enable transmission and receipt of wireless signals, e.g., according to one or more of a local area or wide area wireless communication scheme, such as Zigbee, Bluetooth, IEEE 802.11, IEEE 802.15.4, cellular communication or so forth via connection to front end module 490, in turn coupled to an antenna 495. Understand while shown with this high level view, many variations and alternatives are possible.

Note that an IoT device leveraging an embodiment may be, as two examples, an IoT device of a home or industrial automation network or a smart utility meter for use in a smart utility network, e.g., a mesh network in which communication is according to an IEEE 802.15.4 specification or other such wireless protocol.

Figure 5:
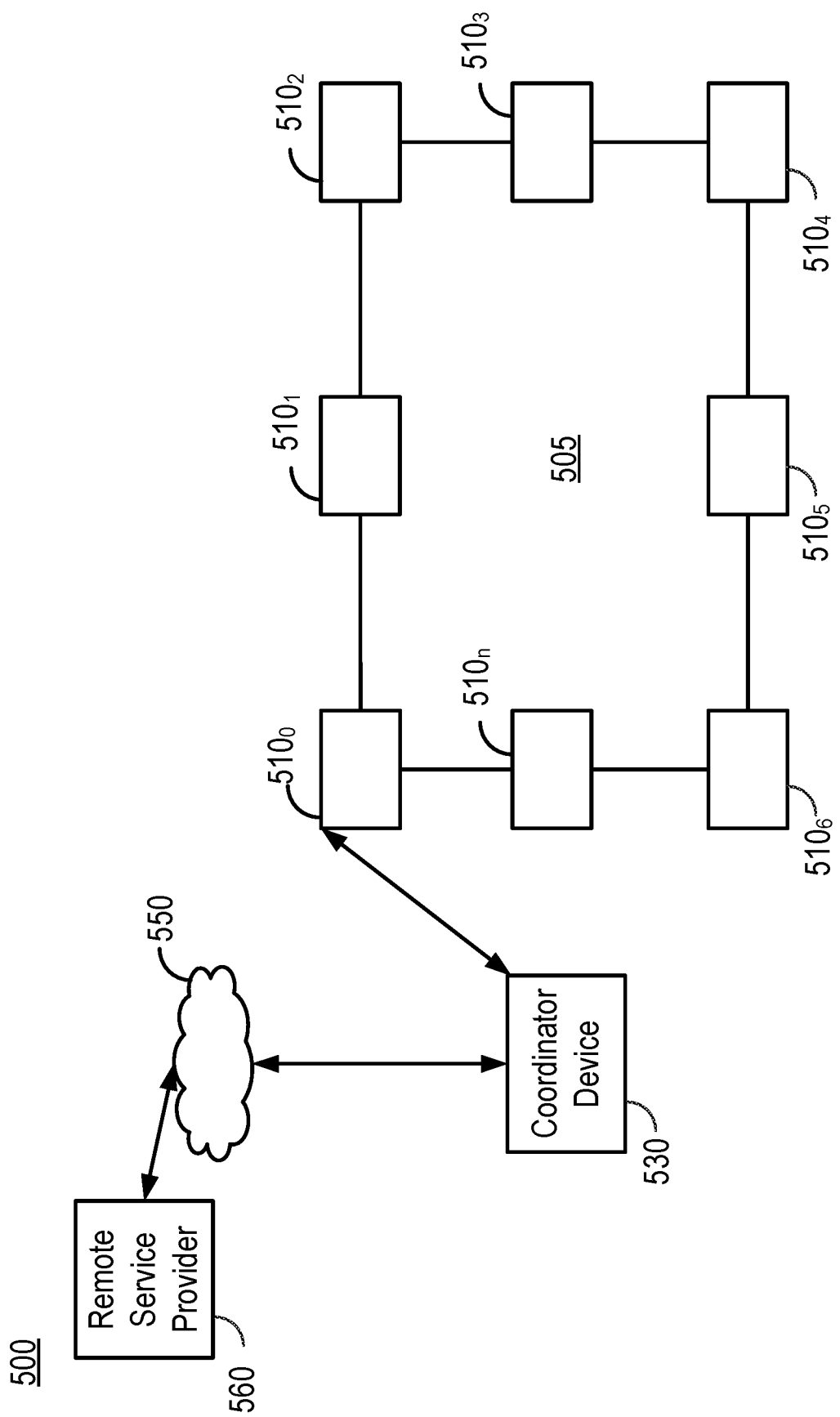
FIG. 5 is a high level diagram of a network in accordance with an embodiment.

Referring now to FIG. 5, shown is a high level diagram of a network in accordance with an embodiment. As shown in FIG. 5, a network 500 includes a variety of devices, including smart devices such as IoT devices, coordinator devices and remote service providers. In the embodiment of FIG. 5, a mesh network 505 may be present, e.g., in a building having multiple IoT devices 5100-*n*. Such IoT devices may include a single SAW filter and switching circuitry as described herein, to enable transmit and receive paths to leverage this single SAW filter. As shown, at least one IoT device 510 couples to a coordinator device 530 that in turn communicates with a remote service provider 560 via a wide area network 550, e.g., the internet. In an embodiment, remote service provider 560 may be a backend server of a utility that handles communication with IoT devices 510. Understand while shown at this high level in the embodiment of FIG. 5, many variations and alternatives are possible.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. An apparatus comprising:
a first integrated circuit (IC) having a transceiver including a transmit path and a receive path, the first IC comprising:
the transmit path to receive, process and output a transmit radio frequency (RF) signal, the transmit path comprising a first power amplifier;
the receive path to receive, process and output a receive RF signal, the receive path comprising a first low noise amplifier (LNA), the first LNA separate from the first power amplifier; and
switching circuitry coupled to the transmit path and the receive path, wherein:
in a transmit mode, the switching circuitry is to cause a RF filter to couple into the transmit path to filter the transmit RF signal and cause the filtered transmit RF signal to be provided to the first power amplifier and thereafter to an antenna, the RF filter comprising a surface acoustic wave (SAW) filter, the SAW filter external to the first IC and coupled to the first IC via a first conductive element and a second conductive element; and
in a receive mode, the switching circuitry is to cause the receive RF signal to be provided to the RF filter and the first LNA, and thereafter to be provided to a digital processor.

2. The apparatus of claim 1, wherein the switching circuitry comprises:
a first switch, wherein in the transmit mode, the first switch is to receive the transmit RF signal from the digital processor and provide the transmit RF signal to a second switch;
the second switch coupled to the first switch, wherein in the transmit mode, the second switch is to provide the transmit RF signal to the RF filter; and
a third switch, wherein in the transmit mode, the third switch is to receive the filtered transmit RF signal from the RF filter and provide the filtered transmit RF signal to the first power amplifier.

3. The apparatus of claim 2, wherein the switching circuitry further comprises a fourth switch coupled to the first power amplifier, wherein in the transmit mode, the fourth switch is to provide the amplified transmit RF signal to an antenna.

4. The apparatus of claim 3, wherein in the receive mode, the fourth switch is to provide the receive RF signal to a selected one of:
the third switch, to cause the receive RF signal to be provided to the RF filter; and
a fifth switch to cause the receive RF signal to be provided to the first LNA.

5. The apparatus of claim 4, further comprising:
a sixth switch coupled to the first LNA; and
a seventh switch coupled to the sixth switch and the second switch, wherein the seventh switch is to provide the receive RF signal to the digital processor.

6. The apparatus of claim 4, wherein:
in a first sub-mode of the receive mode, the third switch is to provide the receive RF signal to the RF filter, and the second switch is to cause the filtered receive RF signal to be provided to the first LNA; and
in a second sub-mode of the receive mode, the fourth switch is to provide the receive RF signal to the fifth switch and the fifth switch is to provide the receive RF signal to the first LNA.

7. The apparatus of claim 2, wherein in a bypass transmit mode, the third switch is to receive the transmit RF signal from the RF filter and cause the transmit RF signal to bypass the first power amplifier.

8. The apparatus of claim 1, further comprising a controller, wherein the controller is to receive a plurality of control signals from the digital processor and based at least in part on the plurality of control signals, to configure the switching circuitry.

9. The apparatus of claim 8, wherein in the transmit mode, the controller is to configure the switching circuitry to provide the transmit RF signal to the RF filter.

10. The apparatus of claim 8, wherein the controller:
in a first receive mode, is to configure the switching circuitry to cause the receive RF signal to be provided to the RF filter and thereafter to the first LNA; and
in a second receive mode, is to configure the switching circuitry to cause the receive RF signal to be provided to the first LNA and thereafter to the RF filter.

11. A method comprising:
receiving, in a controller of a first integrated circuit comprising a radio frequency (RF) front end circuit, a plurality of control signals from a second integrated circuit comprising a processor;
dynamically configuring switch circuitry of the RF front end circuit based at least in part on at least some of the plurality of control signals; and
communicating a first RF signal through the RF front end circuit via the switch circuitry and through a surface acoustic wave (SAW) filter external to the first integrated circuit and the second integrated circuit, wherein the SAW filter is used in a transmit mode and in a receive mode.

12. The method of claim 11, further comprising decoding, in the controller, the plurality of control signals to identify one of the transmit mode or the receive mode.

13. The method of claim 12, further comprising identifying, based on the decoding, a first receive sub-mode in which, via the switch circuitry, the first RF signal is to pass to the SAW filter and thereafter to a low noise amplifier (LNA) of the RF front end circuit.

14. The method of claim 12, further comprising identifying, based on the decoding, a second receive sub-mode in which, via the switch circuitry, the first RF signal is to bypass the SAW filter.

15. A system comprising:
a first integrated circuit comprising:
a digital processor to perform at least one function, and
transceiver circuitry coupled to the digital processor, the transceiver circuitry comprising:
a first amplifier to amplify a transmit radio frequency (RF) signal; and
a second amplifier to amplify a receive RF signal;
a second integrated circuit coupled to the first integrated circuit, the second integrated circuit comprising:
a RF front end circuit, the RF front end circuit comprising:
a transmit path to receive, process and output the transmit RF signal, the transmit path comprising a third amplifier;
a receive path to receive, process and output the receive RF signal, the receive path comprising a fourth amplifier; and
switching circuitry coupled to the transmit path and the receive path, wherein:
in a transmit mode, the switching circuitry is to direct the transmit RF signal to a RF filter and the third amplifier, and thereafter to an antenna; and
in a receive mode, the switching circuitry is to direct the receive RF signal to the RF filter and the fourth amplifier, and thereafter to the first integrated circuit;
the RF filter coupled to the second integrated circuit; and
the antenna coupled to the second integrated circuit, the antenna to receive the receive RF signal and radiate the transmit RF signal.

16. The system of claim 15, wherein the switching circuitry comprises:
a first switch, wherein in the transmit mode, the first switch is to receive the transmit RF signal from the first integrated circuit and provide the transmit RF signal to a second switch;
the second switch coupled to the first switch, wherein in the transmit mode, the second switch is to provide the transmit RF signal to the RF filter;
a third switch, wherein in the transmit mode, the third switch is to receive the transmit RF signal from the RF filter and provide the transmit RF signal to the third amplifier; and
a fourth switch coupled to the third amplifier, wherein:
in the transmit mode, the fourth switch is to provide the transmit RF signal to the antenna; and
in the receive mode, the fourth switch is to provide the receive RF signal to the fourth amplifier.

17. The system of claim 16, further comprising an attenuator coupled between the second switch and a fifth switch, and wherein in at least one of the transmit mode and the receive mode, the attenuator is to attenuate at least one of the transmit RF signal and the receive RF signal.

18. The system of claim 15, wherein the RF front end circuit comprises a controller to receive a plurality of control signals from the first integrated circuit and based at least in part on the plurality of control signals, to configure the switching circuitry, wherein:
in a first receive mode, the controller is to configure the switching circuitry to cause the receive RF signal to be provided to the RF filter and thereafter to the fourth amplifier; and
in a second receive mode, the controller is to configure the switching circuitry to cause the receive RF signal to be provided to the fourth amplifier and thereafter to the RF filter.

19. The apparatus of claim 15, wherein the RF front end circuit further comprises a fifth amplifier, wherein in the receive mode, the switching circuitry is to direct the receive RF signal to the RF filter, and at least one of the fourth amplifier and the fifth amplifier.

* * * * *